United States Patent [19]

Iijima

[11] Patent Number: 4,967,391
[45] Date of Patent: Oct. 30, 1990

[54] DATA STRING RETRIEVAL APPARATUS FOR IC CARD

[75] Inventor: Yasuo Iijima, Yokohama, Japan

[73] Assignee: Kabushiki Kaisha Toshiba, Kawasaki, Japan

[21] Appl. No.: 324,445

[22] Filed: Mar. 16, 1989

[30] Foreign Application Priority Data

Mar. 18, 1988 [JP] Japan ................................. 63-63464
Mar. 18, 1988 [JP] Japan ................................. 63-63473

[51] Int. Cl.$^5$ ............................................. G06F 1/00
[52] U.S. Cl. ..................................... 364/900; 364/963; 364/963.5; 364/929.4
[58] Field of Search ............ 364/715.11, 200 MS File, 364/900 MS File

[56] References Cited

U.S. PATENT DOCUMENTS 4,068,301 1/1978 Ishino et al. ........................ 364/200
4,152,762 5/1979 Bird et al. ........................... 364/200

FOREIGN PATENT DOCUMENTS 89104641 3/1990 European Pat. Off. .

Primary Examiner—Raulfe B. Zache
Attorney, Agent, or Firm—Cushman, Darby & Cushman

[57] ABSTRACT

Two access buses are arranged such that one access bus connects a memory section from which data is retrieved to a retrieval section, and the other access bus is connected to a control section. The two access buses are connected to each other through a gate. While the retrieval section is operated, the gate is disabled. Otherwise, the gate is enabled. Key words located at different positions are sampled, and compared with a plurality of key words externally supplied. A data string to be retrieved is then recognized in accordance with a combination of a plurality of comparison results. In addition, retrieval is performed upon determination whether data string length data added to the start portion of the data string or predetermined data string length data supplied from the control section is used as data string length data for generating the start address of the next data string.

6 Claims, 15 Drawing Sheets

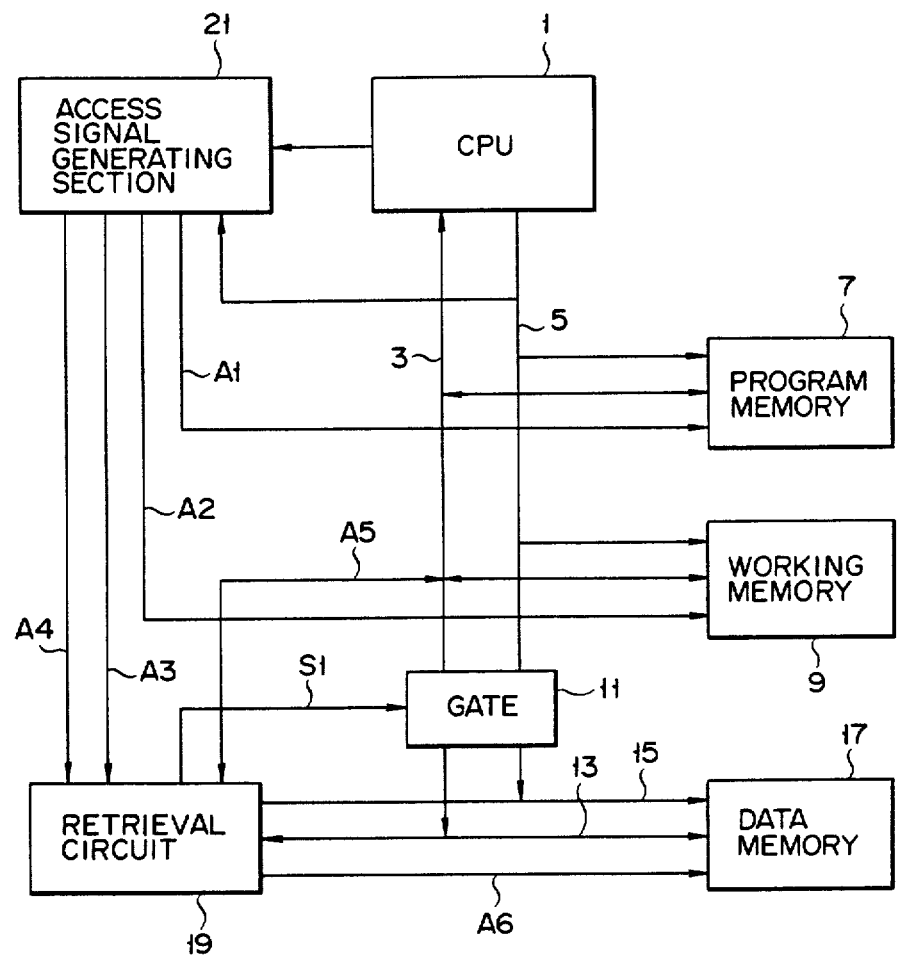
F I G. 1

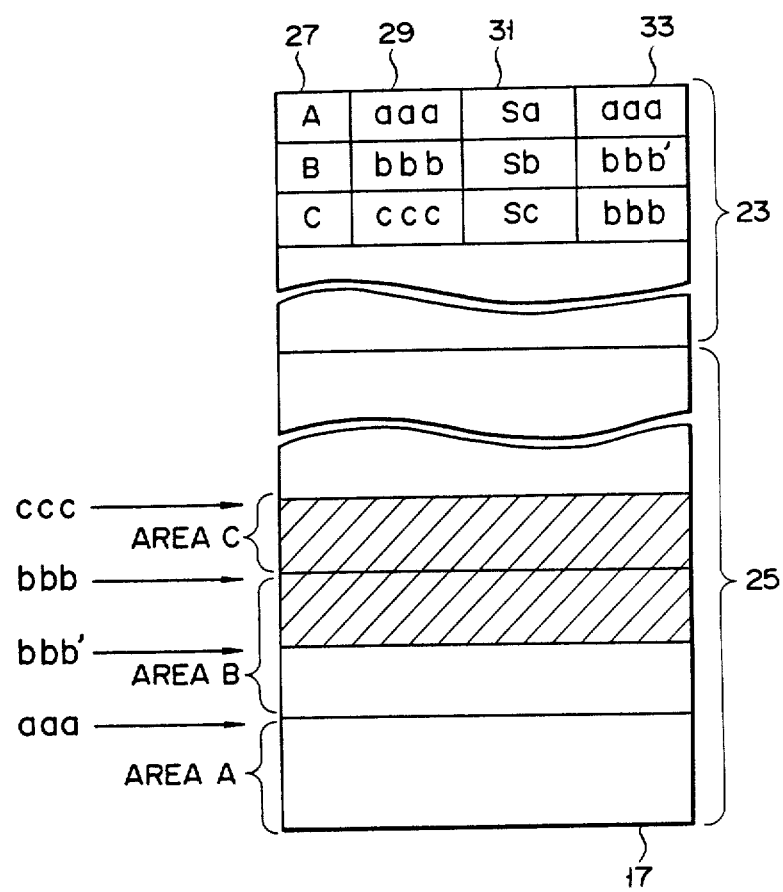
F I G. 2

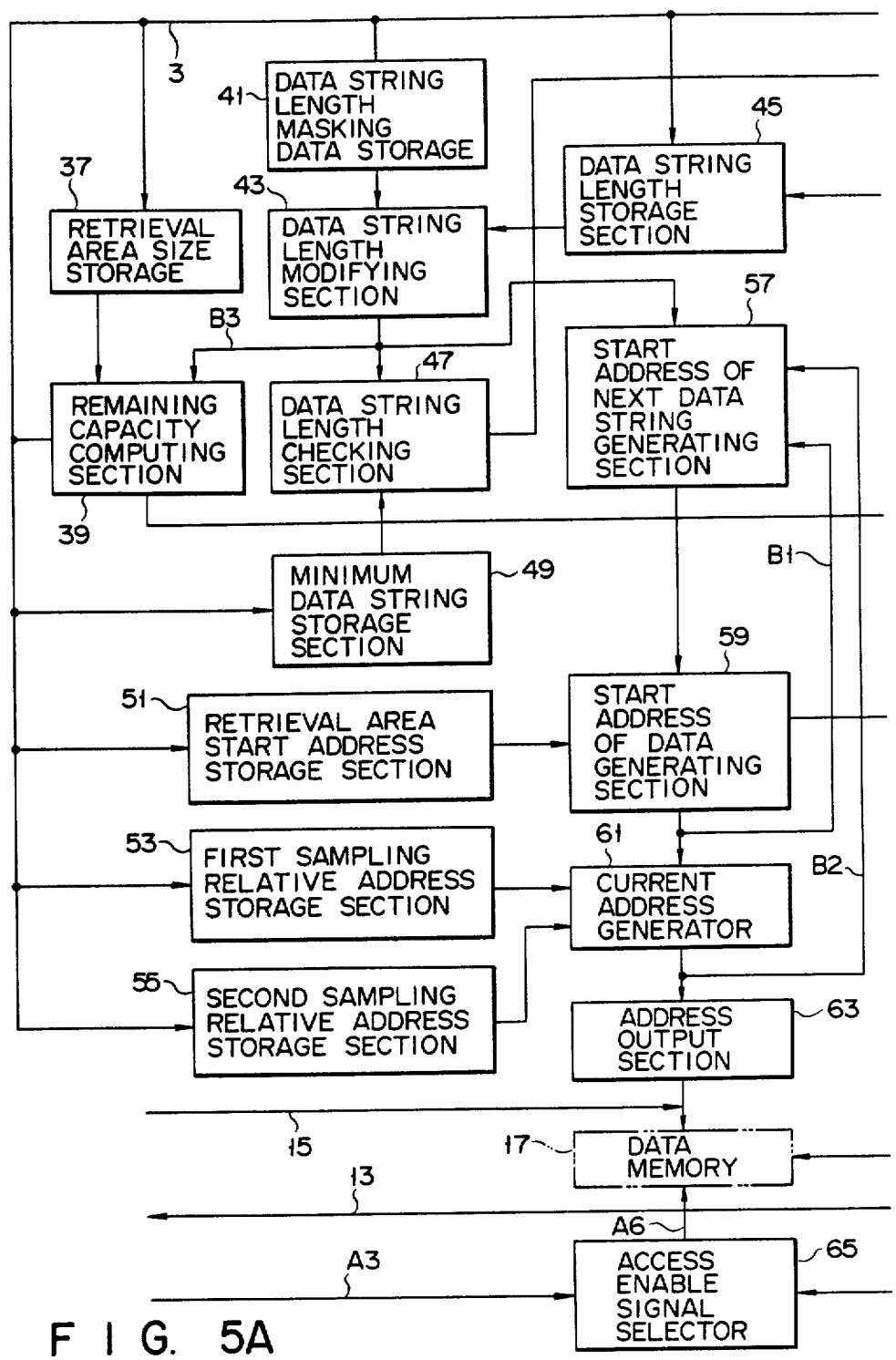
F I G. 5A

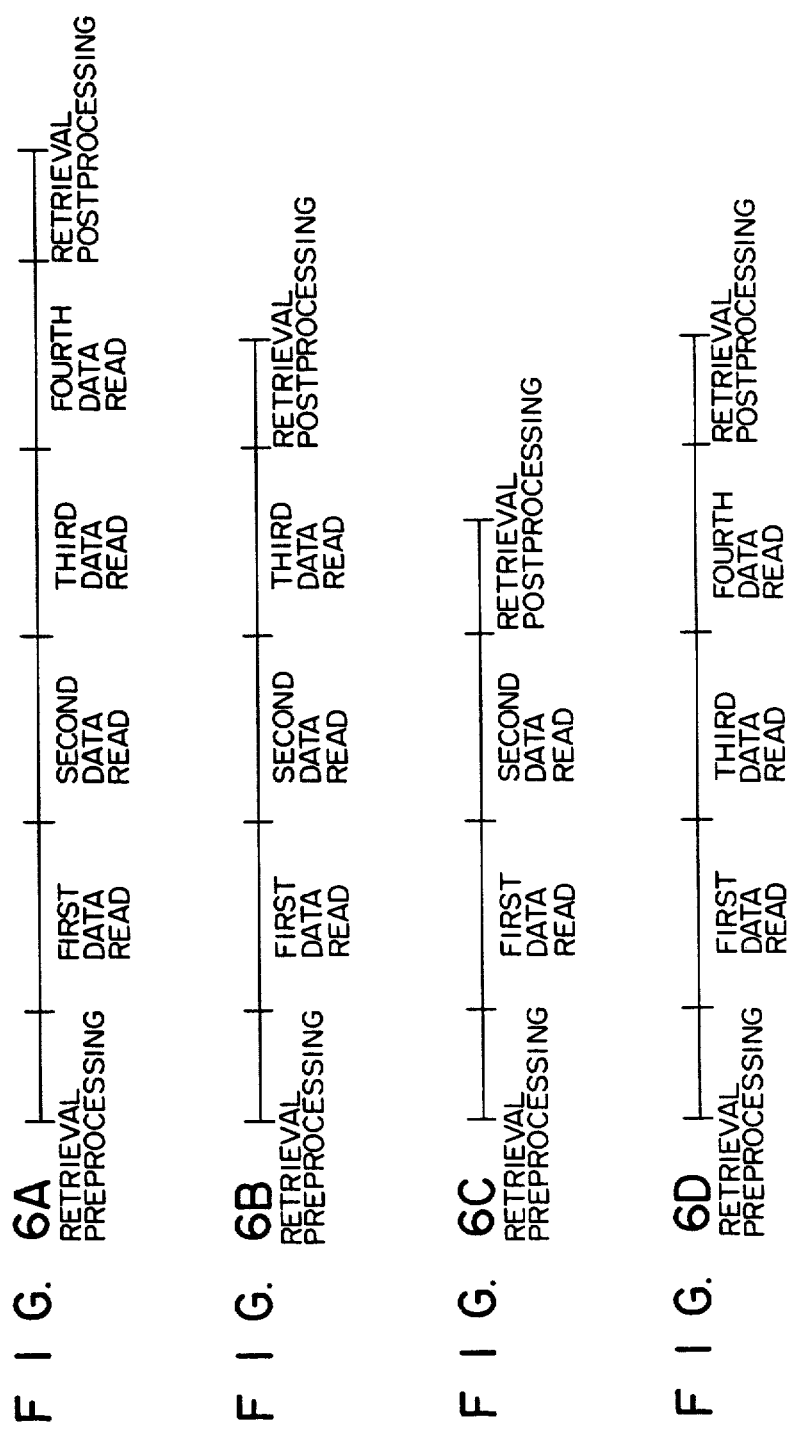

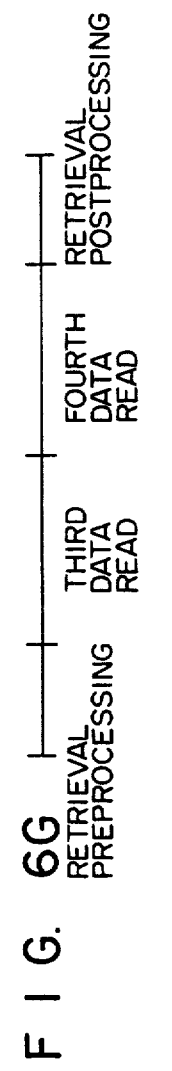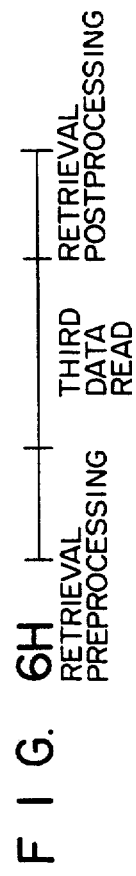

| ADDRESS | DATA | | | | | | | | | | | | | | |
|---|---|---|---|---|---|---|---|---|---|---|---|---|---|---|---|
| | | 00 | 10 | 20 | 30 | 40 | 50 | 60 | 70 | 80 | 90 | A0 | B0 | C0 | D0 | E0 |
| 2000 | 00 | 10 | 20 | 00 | | | | | | | | | | | |
| 2010 | 00 | 20 | 20 | 10 | | | | | | | | | | | |
| 2020 | 00 | 30 | 20 | 20 | | | | | | | | | | | |
| 2030 | 00 | 10 | 20 | 30 | | | | | | | | | | | |
| 2040 | 81 | 20 | 20 | 40 | | | | | | | | | | | |
| 2050 | 00 | 30 | 20 | 50 | | | | | | | | | | | |
| 2060 | 00 | 10 | 20 | 60 | | | | | | | | | | | |
| 2070 | 00 | 20 | 20 | 70 | | | | | | | | | | | |
| 2080 | 00 | 30 | 20 | 80 | | | | | | | | | | | |
| 2090 | 00 | 10 | 20 | 90 | | | | | | | | | | | |
| 20A0 | 00 | 20 | 20 | A0 | | | | | | | | | | | |
| 20B0 | 00 | 30 | 20 | B0 | | | | | | | | | | | |
| 20C0 | 80 | 10 | 20 | C0 | | | | | | | | | | | |
| 20D0 | 00 | 20 | 20 | D0 | | | | | | | | | | | |
| 20E0 | 00 | 30 | 20 | E0 | | | | | | | | | | | |

FIG. 8A

| ADDRESS | DATA | | | |
|---|---|---|---|---|
| 20F0 | 00 | 10 | 20 | F0 |
| 2100 | 00 | 20 | 21 | 00 |
| 2110 | 00 | 30 | 21 | 10 |
| 2120 | 00 | 00 | 21 | 20 |
| 2130 | 00 | 10 | 21 | 30 |
| 2140 | 00 | 20 | 21 | 40 |
| 2150 | 80 | 30 | 21 | 50 |
| 2160 | 00 | 10 | 21 | 60 |
| 2170 | 00 | 20 | 21 | 70 |
| 2180 | 00 | 30 | 21 | 80 |
| 2190 | 80 | 10 | 21 | 90 |
| 21A0 | 00 | 20 | 21 | A0 |
| 21B0 | 00 | 30 | 21 | B0 |
| 21C0 | 00 | 10 | 21 | C0 |
| 21D0 | 00 | 30 | 21 | D0 |

FIG. 8B

| ADDRESS | DATA | | | | | | | | | | | | | | |
|---|---|---|---|---|---|---|---|---|---|---|---|---|---|---|---|
| 1000 | 00 | 0E | 10 | 00 | ↕ | | | | | | | | | | 00 |
| 1010 | 00 | 1E | 10 | 10 | | ↕ | | | | | | | | | 10 |
| 1020 | 00 | 2E | 10 | 20 | | | ↕ | | | | | | | | 20 |
| 1030 | 00 | 0E | 10 | 30 | | | | ↕ | | | | | | | 30 |
| 1040 | 80 | 1E | 10 | 40 | | | | | ↕ | | | | | | 40 |
| 1050 | 00 | 2E | 10 | 50 | | | | | | ↕ | | | | | 50 |
| 1060 | 00 | 0E | 10 | 60 | | | | | | | ↕ | | | | 60 |
| 1070 | 00 | 1E | 10 | 70 | | | | | | | | ↕ | | | 70 |
| 1080 | 00 | 2E | 10 | 80 | | | | | | | | | ↕ | | 80 |
| 1090 | 00 | 0E | 10 | 90 | | | | | | | | | | ↕ | 90 |
| 10A0 | 00 | 1E | 10 | A0 | | | | | | | | | | | A0 |
| 10B0 | 00 | 2E | 10 | B0 | | | | | | | | | | | B0 |
| 10C0 | 80 | 0E | 10 | C0 | | | | | | | | | | | C0 |
| 10D0 | 00 | 1E | 10 | D0 | | | | | | | | | | | D0 |
| 10E0 | 00 | 2E | 10 | E0 | | | | | | | | | | | E0 |

F I G. 9A

| ADDRESS | DATA | | | |
|---|---|---|---|---|
| 1 0 F 0 | 0 0 | 0 E | 1 0 | F 0 | → F 0 |
| 1 1 0 0 | 0 0 | 1 F | 1 0 | 0 0 | → 0 0 |
| 1 1 1 0 | 8 0 | 2 F | 1 0 | 1 0 | → 1 0 |
| 1 1 2 0 | 0 0 | 0 F | 1 0 | 2 0 | → 2 0 |
| 1 1 3 0 | 0 0 | 1 F | 1 0 | 3 0 | → 3 0 |
| 1 1 4 0 | 8 0 | 2 F | 1 0 | 4 0 | → 4 0 |
| 1 1 5 0 | 8 0 | 0 F | 1 0 | 5 0 | → 5 0 |
| 1 1 6 0 | 0 0 | 1 F | 1 0 | 6 0 | → 6 0 |
| 1 1 7 0 | 0 0 | 2 F | 1 0 | 7 0 | → 7 0 |
| 1 1 8 0 | 0 0 | 0 F | 1 0 | 8 0 | → 8 0 |
| 1 1 9 0 | 8 0 | 1 F | 1 0 | 9 0 | → 9 0 |
| 1 1 A 0 | 0 0 | 2 F | 1 0 | A 0 | → A 0 |
| 1 1 B 0 | 0 0 | 0 F | 1 0 | B 0 | → B 0 |
| 1 1 C 0 | 0 0 | 1 F | 1 0 | C 0 | → C 0 |
| 1 1 D 0 | 0 0 | 2 F | 1 0 | D 0 | → D 0 |

F I G. 9B

| | NUMBER OF BYTES | CASE 1 | CASE 2 | CASE 3 | CASE 4 | CASE 5 | CASE 6 | CASE 7 | CASE 8 | CASE 9 | CASE 10 | CASE 11 |
|---|---|---|---|---|---|---|---|---|---|---|---|---|
| MODE DATA | 1 | F0 | 30 | 30 | 10 | 00 | 02 | 12 | 01 | 13 | 06 | 05 |
| RETRIEVAL AREA START ADDRESS | 2 | 2000 | 2000 | 2000 | 2000 | 2100 | 2000 | 2000 | 2191 | 21D0 | 1010 | 1101 |
| RETRIEVAL AREA SIZE | 2 | 01E0 | 01E0 | 01E0 | 01E0 | 0080 | 01E0 | 01E0 | 01E0 | 01E0 | 00F0 | 00DF |
| DATA STRING LENGTH | 2 | 0010 | 0010 | 0010 | 0010 | 0020 | * | * | * | 0010 | * | * |
| DATA STRING LENGTH MASKING DATA | 2 | FFFF | FFFF | FFFF | FFFF | FFFF | 7FFF | 00FF | FFFF | FFFF | 7FFF | FFFF |
| MINIMUM DATA STRING LENGTH | 2 | 0000 | 0000 | 0000 | 0000 | 0000 | 0000 | 0000 | 0000 | 0000 | 0018 | 0000 |
| DATA STRING NUMBER DESIGNATION DATA | 2 | 0003 | 0001 | 0005 | 0001 | 0004 | 0003 | FFFF | 0001 | 0001 | 0001 | 0002 |
| FIRST KEY DATA | 1 | 10 | 10 | 10 | 10 | * | * | 80 | * | 10 | * | * |
| FIRST MASK DATA | 1 | FF | FF | 10 | FF | * | * | 80 | * | FF | * | * |
| FIRST SAMPLING RELATIVE ADDRESS | 2 | 0001 | 0001 | 0001 | 0003 | * | * | 0000 | * | 0003 | * | * |
| SECOND KEY DATA | 1 | 30 | 21 | 21 | * | * | * | * | * | * | * | * |
| SECOND MASK DATA | 1 | FF | FF | FF | * | * | * | * | * | * | * | * |
| SECOND SAMPLING RELATIVE ADDRESS | 2 | 0001 | 0002 | 0002 | * | * | * | * | * | * | * | * |

| | | NUMBER OF BYTES | CASE 1 | CASE 2 | CASE 3 | CASE 4 | CASE 5 | CASE 6 | CASE 7 | CASE 8 | CASE 9 | CASE 10 | CASE 11 |
|---|---|---|---|---|---|---|---|---|---|---|---|---|---|
| RESULT 1 | RETRIEVAL DATA STRING START ADDRESS | 2 | 2030 | 2120 | 2170 | 2010 | 2160 | 2030 | 21C0 | 2190 | 2110 | 1010 | 1101 |
| | AREA REMAINING CAPACITY | 2 | 01A0 | 00B0 | 0060 | 01C0 | 0040 | 01A0 | 0000 | 002F | 0110 | 00D0 | 00CF |
| | DESIGNATION DATA STRING NUMBER REMAINING CAPACITY | 2 | 0000 | 0000 | 0000 | 0000 | 0000 | 0000 | FFFB | 0000 | 0000 | 0000 | 0000 |
| | NUMBER OF RETRIEVED DATA STRINGS | 2 | 0004 | 0013 | 0018 | 0002 | 0004 | 0003 | 0014 | 0001 | 000D | 0001 | 0001 |
| RESULT 2 | RETRIEVAL DATA STRING START ADDRESS | 2 | 2080 | 2150 | 21D0 | 2110 | 21A0 | 2160 | — | 21B1 | 2010 | 1030 | 1111 |
| | AREA REMAINING CAPACITY | 2 | 0150 | 0080 | 0000 | 00C0 | 0010 | 0060 | — | 001F | 0010 | 00C0 | 00AF |
| | DESIGNATION DATA STRING NUMBER REMAINING CAPACITY | 2 | 0000 | 0000 | 0001 | 0000 | 0000 | 0002 | — | 0000 | 0000 | 0000 | 0000 |
| | NUMBER OF RETRIEVED DATA STRINGS | 2 | 0009 | 0016 | 001E | 0012 | 0006 | 0006 | — | 0002 | 001D | 0002 | 0002 |

|  | NUMBER OF BYTES | CASE 1 | CASE 2 | CASE 3 | CASE 4 | CASE 5 | CASE 6 | CASE 7 | CASE 8 | CASE 9 | CASE 10 | CASE 11 |
|---|---|---|---|---|---|---|---|---|---|---|---|---|
| RESULT 3 | RETRIEVAL DATA STRING START ADDRESS | 2 | 20C0 | 2180 | — | 21D0 | — | 21B0 | — | 21C1 | 2000 | — | 1131 |
| | AREA REMAINING CAPACITY | 2 | 0110 | 0050 | — | 0000 | — | 0020 | — | 0001 | 0000 | — | 009F |
| | DESIGNATION DATA STRING NUMBER REMAINING CAPACITY | 2 | 0000 | 0000 | — | 0001 | — | 0000 | — | 0000 | 0001 | — | 0000 |
| | NUMBER OF RETRIEVED DATA STRINGS | 2 | 000D | 0019 | — | 001E | — | 0009 | — | 0003 | 001E | — | 0003 |
| RESULT 4 | RETRIEVAL DATA STRING START ADDRESS | 2 | 2110 | 21B0 | — | — | — | 21C0 | — | — | — | — | 1141 |
| | AREA REMAINING CAPACITY | 2 | 00C0 | 0020 | — | — | — | 0000 | — | — | — | — | 007F |
| | DESIGNATION DATA STRING NUMBER REMAINING CAPACITY | 2 | 0000 | 0000 | — | — | — | 0002 | — | — | — | — | 0000 |
| | NUMBER OF RETRIEVED DATA STRINGS | 2 | 0011 | 001C | — | — | — | 000A | — | — | — | — | 0004 |

F I G. 10C

DATA STRING RETRIEVAL APPARATUS FOR IC CARD

BACKGROUND OF THE INVENTION

1. Field of the Invention

The present invention relates to a data string retrieval apparatus, used in a microcomputer system such as an IC card, for retrieving a data string from a memory.

2. Description of the Related Art

Of microcomputer systems, an IC card, for example, attracts a great deal of attention. An IC card has a memory which is accessed by a control section, such as a CPU. The memory stores a plurality of data strings. An arbitrary data string of the stored data strings is selectively accessed.

In such an IC card, when a data string in the memory is to be retrieved, the speed of retrieval processing may be increased by assigning retrieval processing to a specific circuit or the like. In this case, the memory must be designed to be accessed by a control section and a retriever means.

In a microcomputer system such as an IC card, however, an access data supply bus is commonly used by the control section and the retrieval means. For this reason, when the retrieval means is operated, the control section must release the bus. Consequently, the control section cannot perform calculation processing or access a memory other than the memory from which data is retrieved during an operation of the retriever means.

Furthermore, in a retrieval apparatus designed such that, for example, a single key word is recognized and a data string including this key word is then retrieved, if two or more key words are required to be conditioned for retrieval processing, serious inconvenience inevitably occurs. That is, the control section must check a data string obtained upon retrieval using an arbitrary key word whether it satisfies the second and subsequent key words. This applies to a case wherein a data string is retrieved by a combination of a plurality of key words.

According to such a retrieval scheme, a desired data string may not be retrieved unless processing of the retrieval apparatus and determination of the control section are performed a plurality of times. Consequently, the processing speed of the IC card is decreased.

As described above, according to the conventional retrieval schemes, retrieval using a plurality of key words cannot be easily performed, and moreover, a combination condition of key words cannot be set. Therefore, such schemes are not suitable for retrieval of a data string having a plurality of attribute data, such as a data string in a memory of an IC card. Hence, high-speed retrieval processing cannot be realized.

In addition, according to a retrieval scheme employed by a conventional data string retrieval apparatus, the length of a data string to be retrieved is recognized in advance by the apparatus, and the data string is sequentially retrieved based on the recognized data string length.

In some current data file systems, however, data strings are stored using a variable-length format by adding data string length data to the start portion of each data string. The conventional data string retrieval apparatus cannot process such a variable-length data string.

In a data file management system for, e.g., an IC card, in order to allow the IC card to cope with various applications, a memory is divided into a plurality of areas to be managed. Fixed-length or variable-length data is employed depending on an area.

In order to cope with such a case, a conventional system employs a scheme wherein two apparatuses, i.e., fixed-length and variable-length data string retrieval apparatuses are arranged, and a control section selectively uses the two apparatuses. In this scheme, however, the control section must selectively use the two data string retrieval apparatuses, and the size of the overall data string retrieval apparatuses is increased, thus undesirably increasing the size of the total system.

SUMMARY OF THE INVENTION

It is an object of the present invention to provide a data string retrieval apparatus which can allow a control section to access a memory other than a memory from which data is retrieved even during an operation of a retrieval circuit.

It is another object of the present invention to provide a data string retrieval apparatus which can perform retrieval using a plurality of key words, set a combination condition, and increase a processing speed.

It is still another object of the present invention to provide a data string retrieval apparatus which can easily retrieve fixed-length and variable-length data strings without using another retrieval apparatus and which can be realized with a small size.

In order to achieve the above objects, the present invention preferably includes a memory to store data strings and a controller to control retrieval of the data strings from the memory and to perform predetermined processing of the retrieved data strings. A retrieval circuit responds to the controller to retrieve the data strings from the memory. A first access bus is provided to the controller and a second access bus is provided between the memory and the retrieval circuit. Gates then coordinate the data across the buses by supplying to the second access bus data which is supplied from the controller to the first access bus. Finally, the gates are disabled when the retriever circuit is operating and is enabled when the retriever circuit is not operating.

In addition, the present invention may provide a memory to store a plurality of data strings and address data supplied to the memory on the basis of externally supplied data string length data. A plurality of relative data, which is externally supplied, is also stored, as is a plurality of key data. The address data is updated and current addresses are generated from the updated addresses and the plurality of relative data. A data string is then read out of the memory and designated a current address. The read out data string is stored and compared with the key data and is retrieved in accordance with a combination of comparison results for each key data.

In addition, the present invention may provide a memory for storing a plurality of data strings and a controller for generating first address data and for accessing the memory to perform predetermined processing on the plurality of data strings. Address updating data is generated and second address data is then generated on the basis of the first address data. The memory is then accessed on the basis of the second address data. Data string length data added to the data string in the memory is read out of the memory and is set as the address updating data or data string length data from the controller is set as the address updating data, depending on a predetermined selection.

According to the data string retrieval apparatus of the present invention, a CPU serving as a control section can access a memory other than a memory from which data is retrieved even during an operation of a retrieval circuit. Therefore, the control section can perform other processing, so that the operation speed and efficiency of the system can be greatly increased.

In addition, retrieval using a plurality of key words can be easily performed by sampling key data located at different positions, comparing the sampled key data with a plurality of key data which are externally supplied, and recognizing a data string to be retrieved in accordance with a combination of the comparison results, and moreover, a combination condition can be set. Therefore, the apparatus of the present invention is most suitable for retrieval of a data string having a plurality of attribute data, such as a data string in a memory of an IC card. In addition, high-speed retrieval processing can be realized.

Moreover, retrieval is performed by selectively using data string length data added to the start portion of the data string or a predetermined one supplied by the control section as data string length data for generating the start address of an original data string. Therefore, fixed-length and variable-length data strings can be easily retrieved by using a single apparatus, and the size of the apparatus itself can be reduced.

BRIEF DESCRIPTION OF THE DRAWINGS

FIG. 1 is a block diagram showing a data string retrieval apparatus according to an embodiment of the present invention;

FIG. 2 shows a memory map of a data memory in FIG. 1;

FIGS. 5A and 5B are block diagrams showing a detailed arrangement of a retrieval circuit in FIG. 1;

FIGS. 6A through 6I are views for explaining a detailed process of about a first retrieval period in each retrieval mode;

FIGS. 8A, 8B, 9A, and 9B show patterns of data strings stored in the data memory; and FIGS. 10A through 10C are tables, showing the correspondence between retrieval parameters and retrieval results, for explaining data string retrieval operation.

DETAILED DESCRIPTION OF THE PREFERRED EMBODIMENT

Figure 3:
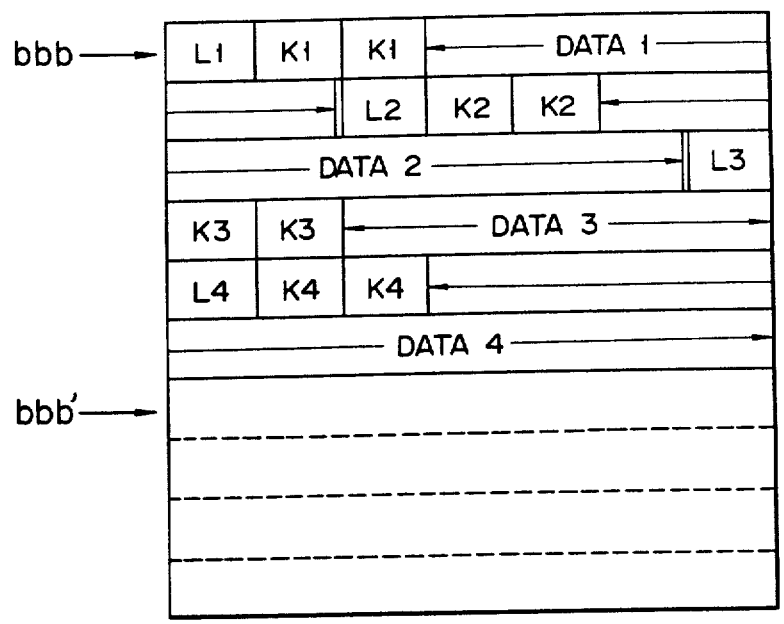
FIGS. 3 and 4 respectively show storage states of data strings in areas in the data memory in FIG. 2.

An embodiment of the present invention will be described below with reference to the accompanying drawings.

FIG. 1 shows an arrangement of a microcomputer system, such as an IC card, to which a data string apparatus according to the present invention is applied. More specifically, a CPU (Central Processing Unit) 1 serves as a control section for controlling the overall system. A first data bus 3 and a first address bus 5 are connected to the CPU 1. Program and working memories 7 and 9 are connected to the buses 3 and 5. In addition, the buses 3 and 5 are respectively connected to second data bus 13 and a second address bus 15 through a bidirectional gate 11. A data memory (memory section) 17 and a retrieval circuit 19 are connected to the buses 13 and 15. The first data bus 3 is also connected to the retrieval circuit 19. In addition, an access signal generating section 21 is connected to the CPU 1 and the first address bus 5.

The CPU 1 sequentially reads out program data stored in the program memory 7 at predetermined timings, and executes various types of control by interpreting the program data. The working memory 9 is used to temporarily store data during a control operation of the CPU 1, and is constituted by, e.g., a RAM. The data memory 17 stores data strings supplied from the outside of the system and the like, and is constituted by, e.g., a nonvolatile memory, such as an EEPROM.

The CPU 1 supplies a fundamental access enable signal (e.g., a memory request, an input/output request, and a read/write enable signal in a Z80CPU) and an address data to the access signal generating section 21. As a result, the section 21 generates access signal groups A1 through A4. The access signal group A1 is enabled when the CPU 1 reads out program data from the program memory 7. The access signal group A2 is enabled when the CPU 1 accesses the working memory 9. The access signal group A3 is enabled when the CPU 1 accesses the data memory 17. The access signal group A4 is an enable signal for starting the retrieval circuit 19 and setting various parameters required therefor.

As will be described below, the retrieval circuit 19 generates an access signal group A6 by selecting an access signal group A5 generated therein and the access signal group A3 supplied from the access signal generating section 21, and supplies it to the data memory 17, thereby accessing the data memory 17.

The CPU 1 and the retrieval circuit 19 commonly use the second data and address buses 13 and 15. Therefore, when the retrieval circuit 19 is started through the access signal group A4 under the control of the CPU 1, the circuit 19 supplies a signal S1 to the gate 11 so as to inform that the circuit 19 is operated. With this operation, the gate 11 disables the first and second data buses 3 and 13 and the first and second address buses 5 and 15 during an operation of the retrieval circuit 19. During this period, the CPU 1 can always monitor stop status, which is output from the retrieval circuit 19 through a line A5, through the first data bus 3. In addition, the CPU 1 can continue the operation by using program data from the program memory 7, and can access the working memory 9.

The data memory 17 comprises, e.g., an area defining section 23 and an area arrangement section 25, as shown in FIG. 2. The area arrangement section 25 has a plurality of areas arranged therein, and is used to store data strings externally supplied to the system of the present invention. The area defining section 23 stores area defining data for defining each area arranged in the area arrangement section 25. The area defining data is constituted by, e.g., an area number 27, an area start address 29, an area size 31, and a pointer 33. When the CPU 1 externally receives the area number 27 of an area to be accessed together with write data, it finds a corresponding area number 27 from the area defining section 23, and recognizes data required for access, such as the start address and size of the area to be accessed. For example, a correspondence is established such that in an area C, the start address is "ccc" and the size is indicated by "Sc bytes".

The pointer is used to indicate how much a given area is used to write data strings. If no data is written in an area, the pointer has the same value as that of the start address of the area. For example, in an area A, since the pointer is "aaa", it indicates an empty state. In an area B, since pointer is "bbb'", it indicates that data strings are already written within the range from "bbb" to "bbb'−1", and hence indicates that a write operation must be started from "bbb'". In the area C, since "bbb" is set (in this case, a portion from "ccc" to "bbb −1" corresponds to the Sc bytes), the pointer indicates that the area C is filled with data strings.

Figure 4:
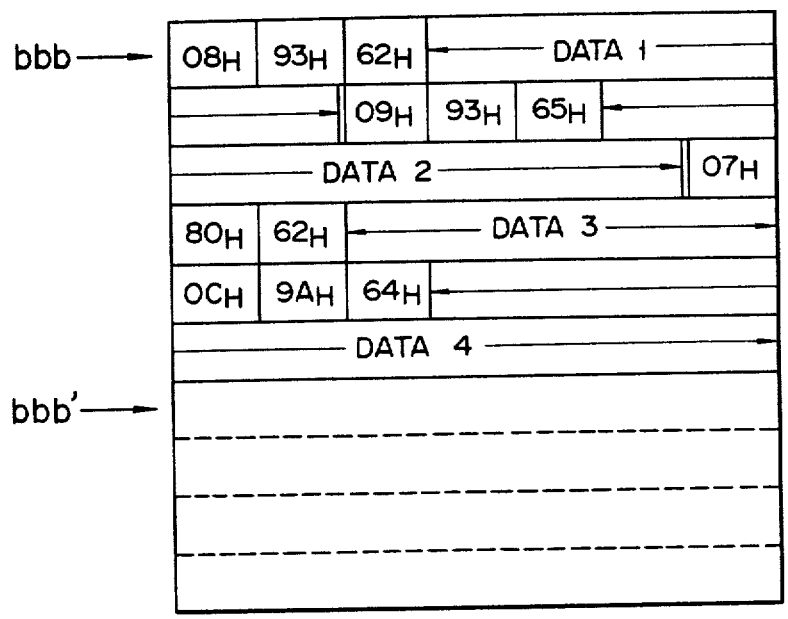

FIG. 3 shows a data string storage state in the area B. As shown in FIG. 3, for example, four data strings are stored, and each data string consists of a 1-byte data string length (L), 2-byte key data (constituted by 1-byte data such as K and k), and data. The data length L represents the number of bytes from a data string length portion to a data portion. FIG. 4 shows a state wherein actual numerical values are set in the data string length L and the key data K and k. Note that each numerical value is represented by hexadecimal (Hex) values. For example, the data string of data 4 has a data string length of $0C_H$ (12 bytes) and key data of $9A_H$ and $64_H$ (two bytes).

Figure 5B:
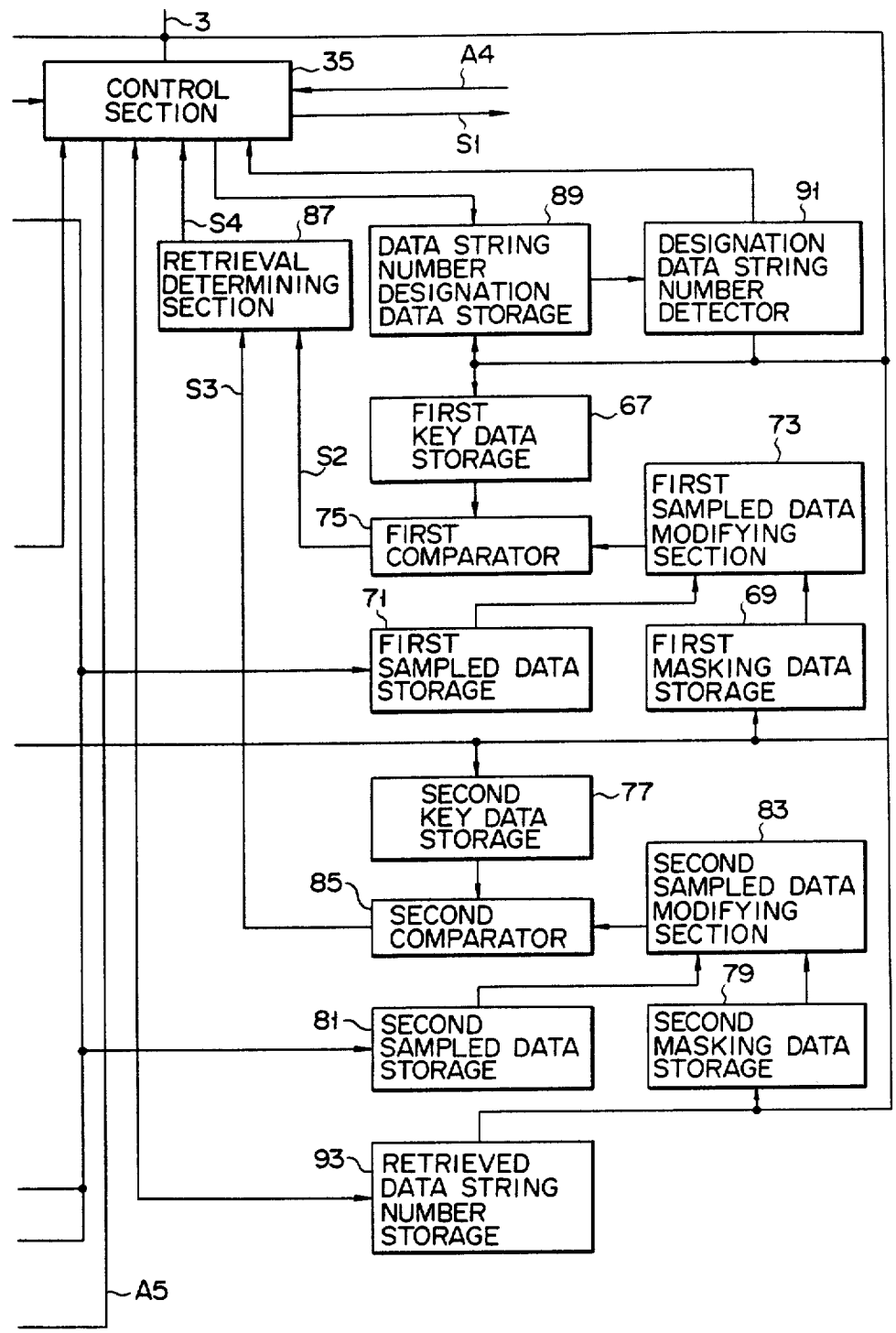

FIGS. 5A and 5B show an arrangement of the retrieval circuit 19. Referring to FIG. 5, reference numeral 35 denotes a control section for performing overall control; 37, a retrieval area size storage for storing retrieval area sizes; 39, a remaining capacity computing section for computing the remaining capacity of a retrieval area; 41, a data string length masking data storage for storing data string length masking data; 43, a data string length modifying section; 45, a data string length storage section for storing data string lengths; 47, a data string length checking section for checking a data string length; 49, a minimum data string storage section for storing a minimum data string length; 51, a retrieval area start address storage section for storing retrieval area start addresses; 53, a first sampling relative address storage section for storing first sampling relative addresses; and 55, a second sampling relative address storage section for storing section sampling relative addresses.

Reference numeral 57 denotes a start address of next data string generating section for generating the start address of a next data string; 59, a start address of data string generating section, for generating the start address of a data string; 61, a current address generator for generating a current address; 63, an address output section for supplying a current address generated by the current address generator 61 to the data memory 17; and 65, an access enable signal section. The access enable signal section 65 generates the access group signal A6 by selecting the access signal group A5 generated by the control section 35 and the access signal group A3 supplied from the access signal generator 21, and supplies it to the data memory 17.

Reference numeral 67 denotes a first key data storage for storing first key data; 69, a first masking data storage for storing first masking data; 71, a first sampled data storage for storing first sampled data; 73, a first sampled data modifying section for modifying first sampled data; 75, a first comparator for comparing the contents of the first key data storage 67 with an output from the first sampled data modifying section 73; 77, a second key data storage for storing second key data; 79, a second masking storage for storing second masking data; 81, a second sampled data storage for storing second sampled data; 83, a second sampled data modifying section for modifying second sampled data; and 85, a second comparator for comparing the contents of the second key data storage 77 with an output from the second sampled data modifying section 83.

Reference numeral 87 denotes a retrieval determining section for performing retrieval determination on the basis of each comparison result from the first and second comparators 75 and 85; 89, a data string number designation data storage for storing data string number designation data; 91, a designation data string number detector for detecting a designation data string number; and 93, a retrieved data string number storage for storing a retrieved data string number.

The control section 35 sets parameter data for each section by using the access signal group A4 supplied under control of the CPU 1, and recognizes the start of the retrieval circuit of the present invention. The parameter data are respectively set by the CPU 1 through the first data bus 3 in the retrieval area size storage 37, the data string length masking data storage 41, the data string length storage section 45, the minimum data string length storage section 49, the retrieval area start address storage section 51, the first sampling relative address storage section 53, the second sampling relative address storage section 55, the first key data storage 67, the first masking data storage 69, the second key data storage 77, the second masking data storage 79, and the data string number designation data storage 89.

In addition, mode data is set in a retrieval mode data storage (arranged in the control section 35 but not shown). The control section 35 generates various retrieval timings by using the mode data. FIGS. 6A through 6I respectively show the timings.

Retrieval preprocessing is processing designed to generate the start address of a data string to be retrieved by using the start address of data generating section 59. Note that retrieval start modes include a first retrieval mode for always performing retrieval from the start data string of an area and a second retrieval mode for performing retrieval from a data string subsequent to a previously retrieved data string. If a start signal supplied from the CPU 1 to the control section 35 through the access signal group A4 is a signal for the first retrieval mode, the control section 35 outputs to a bus B1 a retrieval area start address supplied from the storage section 51 to the generating section 59. If it is a signal for the second retrieval mode, the control section 35 outputs to the bus B1 the start address of a next data string supplied from the generating section 57 to the generating section 59. Note that the address data output to the bus B1 is held until retrieval preprocessing for the next retrieval period is performed.

A first data read process (retrieval of a fixed-length data string) is a process in which when one or more key data are set by using mode data set in the retrieval mode data storage in the control section 35, the first key data is read out and is stored in the first sampled data storage 71. In this case, a read address is obtained by adding a data string start address supplied from the bus B1 to a first sampling relative address supplied from the storage section 53 by using the current address generator 61. The read address thus obtained is output from the generator 61 to the bus B2 and the address output section 63, and is then supplied from the output section 63 to the data memory 17 through the second address bus 15.

A second data read process (retrieval of a fixed-length data string) is a process in which when two key data are set by using mode data set in the retrieval mode data storage, the second key data is read out, and is stored in the second sampled data storage 81. In this case, a read address is obtained by adding a data string start address supplied from the bus B1 to a second sampling relative address supplied from the storage section 55 by using the generator 61, and is supplied to the data memory 17 in the same manner as in the first data read process.

Note that when the control section 35 recognizes on the basis of mode data stored in the retrieval mode data storage that retrieval using key data is not performed, the first and second data read processes are not performed.

A third read process (retrieval of a variable-length data string) is a process in which when an operation of retrieving a data string having a format in which a data length portion having one or more bytes is present at its start portion is set on the basis of mode data set in the retrieval mode data storage, the first 1-byte data of the data string is read out, and is stored in the data string length storage section 45. In this case, as a read address is supplied such that the current address generator 61 supplies a data string start address, which is supplied from the bus B1, to the data memory 17 through the address output section 63 and the second address bus 15.

A fourth data read process (retrieval of a variable-length data string) is a process in which an operation of retrieving a data string having a format in which a 2-byte data string length portion is present at its start portion is set on the basis of mode data stored in the retrieval mode data storage, the second data of the data string is read out, and is stored in the storage section 45. In this case, a read address is obtained by incrementing by one a data string start address supplied from the bus B1 by using the the current address generator 61. The read address thus obtained is supplied from the generator 61 to the data memory 17 through the bus B2, the address output section 63, and the second address bus 15.

Note that when a retrieval operation of a fixed-length data string is set, i.e., an operation of retrieving a data string having a format in which no data string length portion is present at its start portion is set on the basis of mode data set in the retrieval mode data storage, the third and fourth data read processes are not performed.

The data string length storage section 45 stores, e.g., a 45-bit address value. The data read out in the third data read process is set in the upper 8 bits of the 16 bits, whereas the data read out in the fourth data read process is set in the lower 8 bits. In the retrieval periods shown in FIGS. 6B, 6E, and 6H, the data read out in the third data read process is set in the lower 8 bit of the 16 bits while a data value of "$00_H$" is always stored in the upper 8 bits.

In retrieval postprocessing, the control section 35 determines whether an operation of the retrieval circuit is stopped or not, and the start address of a next data string is generated. The start address of the next data string is generated in the following manner. The data string length modifying section 43 calculates a data string length by using the data string length data stored in the data string length storage section 45 in the third and fourth data read processes, and the data string length masking data previously set by the CPU 1 in the data string length masking data storage 41 on the basis of the access signal group A4, and outputs the calculation result to the bus B3. With this function, in a retrieval operation of a data string including, e.g., 2-byte data string length data, and having a format in which, of the 2-byte data string length data, a portion representing a true data string length is set in the lower 13 bits and a data string attribute flag is assigned in the lower 3 bits, the subsequent circuit can use the data string as a 2-byte data by neglecting the upper three bits.

The data string length thus calculated is supplied to the start address of next data string generating section 57 through the bus B3. The generating section 57 adds the data string length supplied through the bus B3 to a data string start address supplied from the bus B1 or B2, and outputs the addition result to the start address of data string generating section 59 as the start address of the next data string. At this time, a value obtained by adding a value of the number of bytes of data representing the data length to the start address of the data string is output to the bus B2 from the current address generator 61. Subsequently, the generating section 57 uses the data supplied to the bus B1 when an operation of retrieving a data string having a format in which the value of a data string including the number of bytes of data representing the data string length is set on the basis of mode data set in the retrieval mode data storage. When an operation of retrieving a data string having a format in which the value of a data string length does not include the number of bytes of data representing the the data string length is set, the generating section 57 uses the data supplied to the bus B2.

The remaining capacity computing section 39 receives a retrieval area size set in the retrieval area size storage 37, and also receives data output from the data string length modifying section 43 through the bus B3 so as to sequentially compute an area remaining capacity after the start address of the next data string. However, if an operation of retrieving a data string having a format in which the value of a data string length includes the number of bytes of data representing the data string length is set on the basis of mode data set in the retrieval mode data, the computing section 39 uses the data supplied to the bus B3 without modifications. If an operation of retrieving a data string having a format in which the value of a data string length does not include the number of bytes of data representing the data string length is set, the computing section 39 adds a value of the number of bytes of data representing the data length to the data supplied to the bus B3, and uses this computation result. In this case, if the remaining capacity of the area becomes zero or a negative value, the computing section 39 outputs a stop request to the control section 35.

At the start of the retrieval circuit, an initial value (0000Hex) is set in the retrieved data string number storage 93, and is incremented by one after the above-described processing.

The data string length checking section 47 compares a value set in the minimum data string length storage section 49 with a value output to the bus B3. If the former value is smaller than the latter value, the checking section 47 outputs a stop request to the control section 35. A stop status signal is stored in the control section 35 so as to allow the CPU 1 to easily determine the source of a stop request.

The first sampled data stored in the first sampled data storage 71 in the first data read process is supplied to the first sampled data modifying section 73. The modifying section 73 receives the first masking data set in the first masking data storage 69, computes an AND product of the first masking data and the first sampled data, and supplies the resultant value to the first comparator 75. The first comparator 75 compares the output data from the modifying section 73 with the first key data set in the first key data storage 67, and supplies the comparison result to the retrieval determining section 87 as a signal S2.

In addition, the second sampled data stored in the second sampled data storage 81 in the second data read process is supplied to the second sampled data modifying section 83. The modifying section 83 receives the second masking data set in the second masking data storage 79, computes the AND of the second masking data with the second sampled data, and supplies the resultant value to the second comparator 85. The second comparator 85 compares the output data from the modifying section 83 with the second key data set in the second key data storage 77, and supplies the comparison result to the retrieval determining section 87 as a signal S3.

The retrieval determining section 87 performs a logical operation of the comparison results and mode data set in the retrieval mode data storage by using the signals S2 and S3, and supplies the resultant value to the control section 35 as a signal S4. Note that the logical operation of comparison results includes OR, i.e., a logical function of determining a data string to be retrieved if one of the two comparison results is true, and AND, i.e., a logical function of determining that a given data string is not the one to be retrieved if both the comparison results are false.

When the control section 35 determines the data string to be retrieved upon reception of the signal, the control section 35 subtracts the data string number set in the data string number designation data storage 89 by one. At this time, the designation data string number detector 91 checks the value of the storage 89, and outputs a stop request to the control section 35 when the value becomes zero.

When retrieval using key data is not performed as shown in FIGS. 6G, 6H, and 6I, the comparison result using the signals S2 and S3 is neglected, and the retrieval determining section 87 unconditionally outputs the signal S4 representing that a given data string is a data string to be retrieved. When retrieval using only a first key data is performed as in FIGS. 6D, 6E, and 6F, the result of the signal S4 is the same as that of the signal S2.

When one of the remaining capacity computing section 39, the data string length checking section 47, and the designation data string number detector 91 outputs a stop request in the above-described manner, the control section 35 stops the operation, and enables the gate 11 by using the signal S1. The CPU 1 then reads out the stop status from the control section 35, the start address of the retrieval data string from the generation section 59, the area remaining capacity from the computing section 39, the designation data string number from the detector 91, and the retrieved data string number from the storage 93 through the first data bus 3, thereby obtaining a retrieval result.

Figure 7:
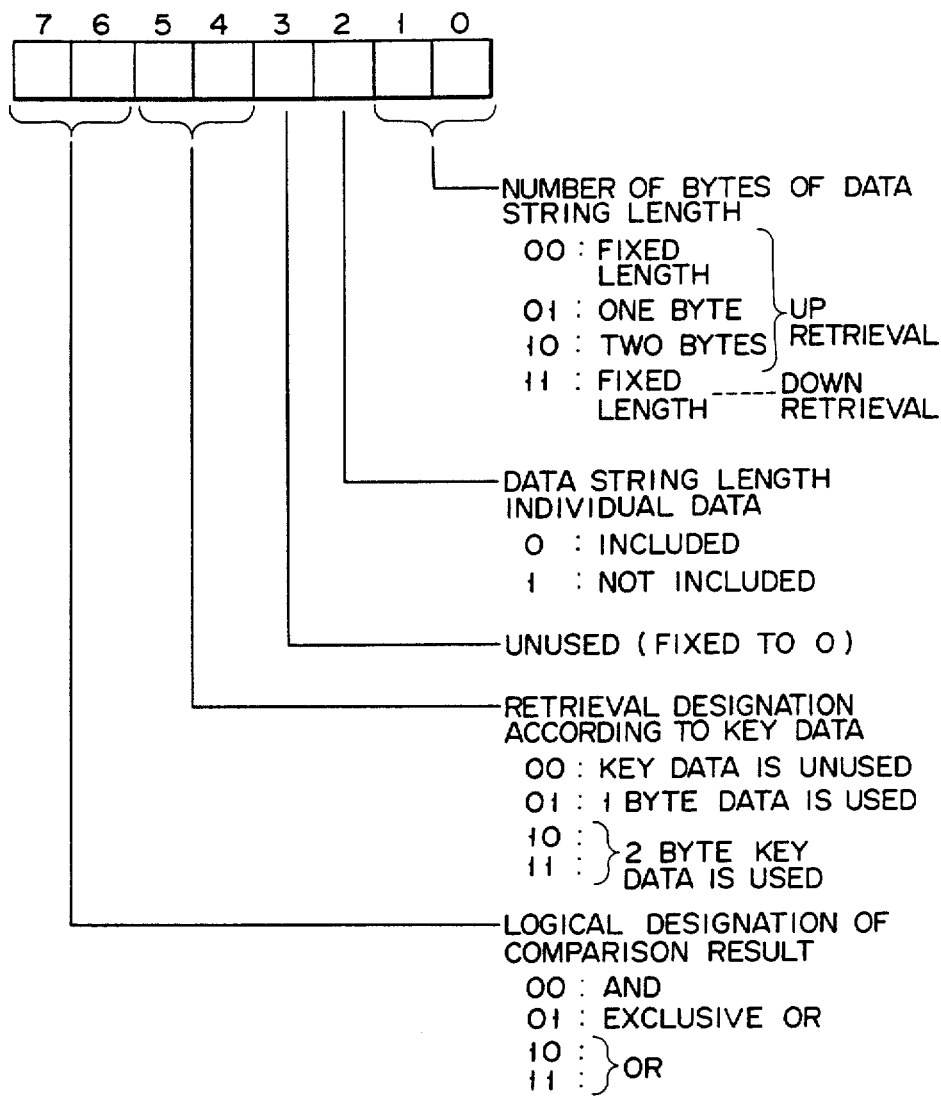
FIG. 7 shows a format of a retrieval mode data.

FIG. 7 shows a format of mode data set in the retrieval mode data storage in the control section 35. The mode data consists of, e.g., one byte. The number of bytes of data string length data added to a data string is recognized by using the zeroth and first bits. If the zeroth and first bits are set as "00" or "11", retrieval is performed by sequentially updating a data string start address on the basis of a fixed length, i.e., a data string length which is set in the data string length storage section 45 in advance without performing the third and fourth data read processes. If "01" is set, a data string having a format in which a data string length is one byte. If "10", a data string having a format in which a data string length consists of two bytes. If "11" is set, retrieval is performed from a larger address to a smaller address by using a decremented fixed-length data.

The second bit represents data string length individual data. If the value of data string length added to a data string to be retrieved includes itself, "0" is set in the second bit, and if it does not include itself, "1" is set. Note that the third bit is unused, and is fixed to "0".

Retrieval designation is performed by using the fourth and fifth bits. If the fourth and fifth bits are set as "00", key data is not used, and hence the first and second data read processes are not performed. If "01" is set in these bits, only one key data is used, and hence the first data read process is performed. If "01" or "11" is set, two key data are used, and hence the first and second data read processes are performed.

The sixth and seventh bits are used to designate logic levels of the signals S2 and S3 in the retrieval determining section 87 when "10" or "11" is designated by the fourth and fifth bits. If the sixth and seventh bits are set as "00", an AND condition is established. Therefore, a data string to be retrieved is determined when both the first and second key data satisfy the AND condition. If "01" is set, an exclusive OR condition is established. If "01" or "11" is set, an OR condition is established.

Retrieval procedures will be described below with reference to FIGS. 8A through 10C. FIGS. 8A and 8B show data strings stored at addresses ("2000 (Hex)" through "21D0 (Hex)". FIGS. 9A and 9B show data strings stored at addresses "1000 (Hex)" through "11D0 (Hex)".

FIGS. 10A through 10C show 11 cases of combinations of mode data and the respective set data, and retrieval results corresponding to the 11 cases. A result 1 represents read parameters when the retrieval circuit is stopped after it is started in the first retrieval mode. Results 2 through 4 represent read parameters at the end of each retrieval operation after the retrieval circuit is repeatedly started and stopped. Note that masking and non-masking data are ANDed in units of bits. Therefore, all the bits of masking data are "1", and non-masking data is used without modifications.

In the case 1, fixed-length up retrieval of data length "10 (Hex)" is performed, and key data are "10 (Hex)" and "30 (Hex)". The first bytes are referred to as key data. A retrieval area start address is "2000 (Hex)", and an area size is "01E0 (Hex)". Processing is interrupted by the third data string of data strings satisfying the conditions.

When a retrieval operation according to the first retrieval mode is started, "2000 (Hex)" is output to the bus B1. In the third data read process, "2000 (Hex)", i.e., "10 (Hex)" is stored in the first sampled data storage 71. Similarly, in the fourth data read process, "10 (Hex)" is stored in the second sampled data storage 81. In this case, since both the first and second masking data are set to be "FF (Hex)", both the first and second sampled data modifying sections 73 and 81 output value "10 (Hex)". Since the first and second key data are respectively "10 (Hex)" and "30 (Hex)", the signal S2 represents a coincidence, and the signal S3 represents a noncoincidence. In this case, the mode represents an OR condition, the data string number designation data is decreased from "0003 (Hex)" to "0002 (Hex)".

In this case, the area remaining capacity becomes "01D0 (Hex)" which is obtained by subtracting a value corresponding to the fixed length, i.e., "0010 (Hex)" from "01E0 (Hex)". The start address of next data string generating section 57 then outputs the next value "2010 (Hex)".

In this case, since a stop condition is not established, the retrieval cycle is resumed. In the next retrieval cycle, since both the first and second sampled data are set to be "20 (Hex)", the data string number designation data is held without modifications. The area remaining capacity is decreased to "01C0 (Hex)", and the generating section 57 outputs "2020 (Hex)". In this case, a stop condition is not satisfied either, and hence the retrieval cycle is resumed.

The result 1 in the case 1 represents a state wherein the data string number designation data becomes "0000 (Hex)" in this manner. In this case, the start address of the retrieved data string is "2030 (Hex)", the area remaining capacity is "01A0 (Hex)", and the number of retrieved data strings is "0004 (Hex)", i.e., four data strings.

When the results 1 through 4 are sequentially viewed, of the data strings in which "10 (Hex)" or "30 (Hex)" is set in the second byte, processing is interrupted at the (3×n)th (n=an integer) data string.

In the case 2, data strings in which "10 (Hex)" is set in the second byte and "21 (Hex)" is set in the third byte are sequentially retrieved.

In the case 3, of data strings in which "10 (Hex)" is set in the second byte and "1" is set in the fourth bit of the third byte, (5×n)th (n=an integer) data strings are retrieved. The reason why retrieval is stopped at the result 2 is that the area remaining capacity becomes zero. Hence, the designation data string number remaining capacity becomes "00001 (Hex)". Therefore, the significant retrieved data strings are obtained only in the result 1.

In the case 4, data strings in which "10 (Hex)" is set in the fourth byte are sequentially retrieved. Retrieval is stopped at the result 3 because the area remaining capacity becomes zero. However, the designation data string number remaining capacity does not become zero. Therefore, only the retrieved data strings in the results 1 and 2 are significant.

In the case 5, (4×n)th (n=an integer) data strings are retrieved without using key data. The data strings in areas having addresses "2100 (Hex)" through "00B0 (Hex)" are retrieved. In addition, a data string length is fixed to "20 (Hex)". In this case, a stop condition is satisfied when the area remaining capacity becomes a negative value. Therefore, the data strings obtained in the result 1 are significant retrieved data strings.

The case 6 exemplifies a retrieval operation of a data string format mode in which 2-byte data string length is added. (3×n)th data strings (n=an integer) are retrieved without using key data. In this format, since the lower 15 bits of the 2-byte data string length, i.e., 16 bits, are used to constitute a significant data string length, the data string masking data is set to be "7FFF (Hex)". In this case, a stop condition in the result 4 is satisfied when the area remaining capacity becomes zero. Since the designation data string number remaining capacity is not zero, the data strings obtained in the results 1 through 3 are significant retrieved data strings.

The case 7 exemplifies the same format mode as in the case 6, wherein data strings in which the upper one bit of a 2-byte data string length is "1" are retrieved. Note that since the lower one byte of 2-byte data string length is significant, the data string length masking data is "00FF (Hex)". In this case, in order to check the number of corresponding data strings, the data string number designation data is set to be "FFFF (Hex)". In this case, zero of the area remaining capacity in the result 1 indicates that retrieval is stopped. Since the number of retrieved data strings is "0014 (Hex)", and the designation data string number remaining capacity is "FFFB (Hex)", the number of corresponding data strings can be given by a calculation of "FFFF−FFFB"=4.

The case 8 exemplifies a retrieval operation of a data string format mode in which a one-byte data string length (the value of a data string length includes a data string length itself) is added. In this case, retrieval is performed without key data. Data strings in areas located at addresses "2191 (Hex)" through "004F (Hex)" are sequentially retrieved. In this case, a stop condition in the result 3 is satisfied when the area remaining capacity becomes negative. Therefore, the data strings obtained in the results 1 and 2 are significant retrieved data strings.

In the case 9, down retrieval is performed under the conditions in the case 4. The retrieval start address is "21D0 (Hex)", and data strings in areas corresponding to "01E0 (Hex)" are retrieved. In this case, a stop condition in the result 3 is satisfied when the area remaining capacity becomes zero. Since the designation data string number remaining capacity is not zero in this case, the data strings obtained in the results 1 and 2 are significant (the same result as in the case 4).

The case 10 exemplifies a retrieval operation of a data string format mode in which a 2-byte data string length (the value of a data string length does not include the data string length itself) is added, wherein retrieval is performed without key word. Note that the minimum data string length is set to "0018 (Hex)" in this case. Therefore, the reason why retrieval is stopped at the result 2 is that the value of the data length of a data string starts from address "1030 (Hex)" is smaller than "0018 (Hex)". Note that the CPU 1 can recognize a data string length shortage in accordance with stop status.

The case 11 exemplifies a retrieval operation of a data string format mode in which a 1-byte data string length (the value of a data string length does not include the data string length itself) is added.

As has been described above, two access buses (data and address buses) are arranged, so that one access bus connects a memory from which data is retrieved (data memory) to a retrieval circuit, and the other access bus connects a CPU to other memories (program and working memories). The two access buses are connected to each other through a gate. While the retrieval circuit is operated, the gate is disabled. In contrast to this, while the retrieval circuit is stopped, the gate is enabled.

With this arrangement, the CPU can access a memory other than the memory from which data is retrieved even during an operation of the retrieval circuit. Therefore, the CPU can perform other processing, and the operation speed and efficiency of the system can greatly be increased.

What is claimed is:

1. A data string retrieval apparatus, comprising:
   storage means for storing a plurality of data strings;
   control means for generating predetermined retrieval data to perform accessing of said storage means;

retrieval means for retrieving a data string to be retrieved on the basis of the retrieval data from said control means;
first access bus means connected to said control means;
second access bus means for connecting said storage means and said retrieval means; and
gate means, connected between said first and second access bus means, for supplying the retrieval data from the control means to the second access bus means through said first access bus means, except during an operation of said retrieval means, whereby said control means is isolated from said storage means and said retrieval means while said retrieval means retrieves a data string from the storage means.

2. An apparatus according to claim 1, further comprising second storage means for storing program data and working data used for a control operation of said control means, said control means accessing said second storage means when said retrieval means accesses said storage means.

3. An apparatus according to claim 1, further comprising a stop status signal line connected between said first access bus means and said retrieval means, said retrieval means signaling an operation stop thereof to said control means by using said stop status signal line.

4. A data string retrieval apparatus comprising:
storage means for storing a plurality of data strings;
means for updating address data supplied to said storage means on the basis of data string length data externally supplied;
relative data storage means for storing a plurality of relative data externally supplied;
key data storage means for storing a plurality of key data representing to be retrieved;
current address generating means for generating a plurality of current addresses from the address data updated by said address updating means and the plurality of relative data in said relative data storage means;
readout means for reading out a data string from said storage means, which is designated by a current address generated by said current address generating means;
data string storage means for storing the data string read out by said readout means;
comparing means for comparing the data string in said data string storage means with the key data in said key data storage means; and
recognizing means for recognizing a data string to be retrieved in accordance with a combination of comparison results for each key data from said comparing means.

5. An apparatus according to claim 4, wherein each of the data strings includes a data string length, key data, and data.

6. A data string retrieval apparatus, comprising:
storage means for storing a plurality of data strings;
control means for generating first address and accessing said storage means so as to perform predetermined processing of the plurality of data strings;
address updating data generating means for generating address updating data;
address generating means for generating second address on the basis of the first address data supplied from said address updating data generating means and said control means;
access means for accessing said storage means on the basis of the second address data generated by said address generating means;
first means for reading out data string length data added to a data string in said storage means, and setting the readout data string length data as the address updating data;
second means for setting data string data supplied from said control means as the address updating data; and
selecting means for selecting one of said first and second means in accordance with externally supplied selection mode data.

* * * * *